(12) United States Patent
Ko et al.

(10) Patent No.: US 9,124,313 B2
(45) Date of Patent: Sep. 1, 2015

(54) MULTI-CELL COOPERATIVE COMMUNICATION SYSTEM AND TERMINAL DEVICE

(75) Inventors: Young Jo Ko, Daejeon (KR); Jae Young Ahn, Daejeon (KR); Jae Heung Kim, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 533 days.

(21) Appl. No.: 13/377,422

(22) PCT Filed: Sep. 11, 2009

(86) PCT No.: PCT/KR2009/005201
§ 371 (c)(1),
(2), (4) Date: Dec. 9, 2011

(87) PCT Pub. No.: WO2010/143780
PCT Pub. Date: Dec. 16, 2010

(65) Prior Publication Data
US 2012/0087423 A1    Apr. 12, 2012

(30) Foreign Application Priority Data
Jun. 10, 2009  (KR) .................. 10-2009-0051457

(51) Int. Cl.
*H04B 7/02* (2006.01)
*H04L 1/02* (2006.01)
*H04B 7/06* (2006.01)

(52) U.S. Cl.
CPC .............. *H04B 7/024* (2013.01); *H04B 7/0639* (2013.01)

(58) Field of Classification Search
CPC .... H04B 7/024; H04B 7/0617; H04B 7/0452; H04B 7/0456; H04L 25/03343
USPC .......... 375/259–285, 295–352, 354, 356, 358
See application file for complete search history.

(56) References Cited

U.S. PATENT DOCUMENTS

| 5,539,749 A | 7/1996 | Eul |
| 2005/0020216 A1 | 1/2005 | Bune |

(Continued)

FOREIGN PATENT DOCUMENTS

KR    10-2008-0022033 A    3/2008

OTHER PUBLICATIONS

Alcatel-Lucent, "Definition of Backhaul according to Level of Cooperation in CoMP UL," 3 pages, 3GPP TSG-RAN WG1 Meeting #57, R1-091751 (2009).

(Continued)

*Primary Examiner* — Sam K Ahn
*Assistant Examiner* — James M Perez
(74) *Attorney, Agent, or Firm* — Nelson Mullins Riley & Scarborough LLP; Anthony A. Laurentano, Esq.; Lewis Lee, Esq.

(57) ABSTRACT

Disclosed is a data transmission system that transmits data by using relay. The relay may select a transmission terminal from among a plurality of terminals accessing a base station. The base station may transmit base station data to the relay during a first time slot, the transmission terminal may transmit terminal data to the relay. The relay may transmit the terminal data to the base station and may transmit the base station data to the transmission terminal during a second time slot.

12 Claims, 5 Drawing Sheets

(56) References Cited

U.S. PATENT DOCUMENTS

| | | | |
|---|---|---|---|
| 2006/0120477 A1 | 6/2006 | Shen et al. | |
| 2008/0260059 A1 | 10/2008 | Pan | |
| 2009/0207822 A1 | 8/2009 | Kim et al. | |
| 2010/0239036 A1* | 9/2010 | Koo et al. | 375/260 |
| 2010/0272032 A1* | 10/2010 | Sayana et al. | 370/329 |
| 2010/0273495 A1 | 10/2010 | Onggosanusi et al. | |
| 2010/0285792 A1* | 11/2010 | Chen et al. | 455/422.1 |

OTHER PUBLICATIONS

Etri, "Coordinated multi-cell transmission for LTE-Advanced downlink," 4 pages, 3GPP TSG RAN WG1 Meeting #54, R1-082896 (2008).

Huawei, "Improvement of UL Macro Diversity Combining in SErving Node B," 3 pages, 3GPP TSG RAN WG3 Meeting #54, R3-061712 (2006).

Huawei, "RAN2 considerations for coordinated multipoint transmission and reception," 5 pages, 3GPP TSG-RAN WG2 meeting #66, R2-093107 (2009).

LG Electronics, "Network MIMO in LTE-Advanced," 5 pages, 3GPP TSG RAN WG1 Meeting #54, R1-082942 (2008).

Texas Instruments, "Aspects of Coordinated Multi-point Transmission for Advanced E-UTRA," 4 pages, 3GPP TSG RAN WG1 #55, R1-084444 (2008).

Texas Instruments, "Network MIMO Precoding," 4 pages, 3GPP TSG RAN WG1 #53bis, R1-082497 (2008).

Zte, "Uplink CoMP joint processing schemes," 2 pages, 3GPP TSG RAN WG1 Meeting #56, R1-090631 (2009).

Simeone, O. et al., "Downlink Macro-diversity with Limited Backhaul Capacity," CCIT Report #671, Nov. 2007, pp. 1-23.

* cited by examiner

MULTI-CELL COOPERATIVE COMMUNICATION SYSTEM AND TERMINAL DEVICE

RELATED APPLICATIONS

This application is a 35 U.S.C. §371 filing of International Application Number PCT/KR2009/005201 which was filed on Sep. 11, 2009, and which claims priority to, and the benefit of, Korean Application No. 10-2009-0051457, filed on Jun. 10, 2009. The contents of the aforementioned application are hereby incorporated herein by reference.

TECHNICAL FIELD

The present invention relates to a multi-cell cooperative communication system and a terminal, and more particularly, to a terminal and a multi-cell cooperative communication system where a plurality of base stations cooperate to support a multi-input multi-output (MIMO) communication with the terminal.

BACKGROUND ART

In general, a terminal located in a boundary between cells is affected by a data signal transmitted from a base station of a serving cell where the terminal belongs, and also is affected by a signal transmitted from a neighbor cell base station that manages a neighbor cell adjacent to the serving cell.

In a general cellular communication, the data signal transmitted from the neighbor cell base station acts as an interference to the data signal transmitted from the serving cell base station, and thus, increasing of a data transmission rate is more limited as an interference caused by the data signal transmitted from the neighbor cell base station is high.

In this instance, when the data signal transmitted from the neighbor cell base station is a data signal for the terminal, the data transmission rate will be more improved than a case that the data signal is transmitted by using a general cellular communication method. In this manner, a method that a plurality of base stations cooperate with each other and perform data communication with the terminal is referred to as a multi-cell cooperative communication.

DISCLOSURE OF INVENTION

Technical Goals

An aspect of the present invention provides a multi-cell cooperative communication system that enables a plurality of cells to cooperatively perform a multi-antenna communication with a terminal.

Technical Solutions

According to an aspect of an exemplary embodiment, there is provided a multi-cell cooperative communication system, including a plurality of base station, each of the plurality of base stations including at least one first antenna, transmitting, by using first antennas, data signals to a terminal including at least one second antenna. Here, each of the plurality of base stations includes the same code book, generates a data signal by precoding at least one data symbol based on the code book, and transmits the data signal to the terminal by using the same radio resource.

According to another aspect of an exemplary embodiment, there is provided a multi-cell cooperative communication system, including a plurality of base stations, each of the plurality of base stations including at least one first antenna, receiving, by using first antennas, a data signal transmitted from a terminal including at least one second antenna. Here, the plurality of base stations includes a serving cell base station and at least one neighbor cell base station. Also, the serving cell base station receives a first data signal, and the at least one neighbor cell base station receives a second data signal, the at least one neighbor cell base station transmits, to the serving cell base station, at least one of second data restored from the second data signal and information about the second data signal, and the serving cell base station restores first data from the first data signal by using at least one of the second data or the information about the second data signal.

According to another aspect of an exemplary embodiment, there is provided a terminal including a storage unit to store a code book including at least one precoding matrix constituted by a plurality of precoding vectors, a receiving unit to receive radio signals from the plurality of base stations, a channel estimating unit to estimate conditions of the plurality of channels established between the plurality of base stations and the terminal, based on the radio signals, a selecting unit to select a single precoding matrix from among the at least one precoding matrix based on the estimated conditions of the plurality of channels, and to select at least one precoding vector from among a plurality of precoding vectors constituting the single precoding matrix, and a transmitting unit to transmit a second feedback signal including information about the selected at least one precoding vector to at least one base station of the plurality of base stations.

According to another aspect of an exemplary embodiment, a plurality of cells cooperatively perform a multi-antenna communication with a terminal.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

A plurality of base stations constituting a multi-cell cooperative communication system may include a base station managing a regular cell, such as a macro cell, a micro cell, and the like, and may also include a relay node. Accordingly, the multi-cell cooperative communication system may be applicable to various types of cooperative communication, such as a cooperative communication using regular cells, a cooperative communication using relay nodes, a cooperative communication using the regular cells and relay nodes, and the like.

In general, a single physical base station may manage one or more cells. Here, a term, "base station", is used as a concept corresponding to a single cell through out the present specification. Accordingly, although physically one base station manages a plurality of cells, it is considered that logical base stations as many as a number of cells exist, and it is assumed that each cell includes a single logical base station that manages the corresponding cell. Hereinafter, the term, "base station", is the logical base station, and thus, and thereby manages one cell.

Figure 1:
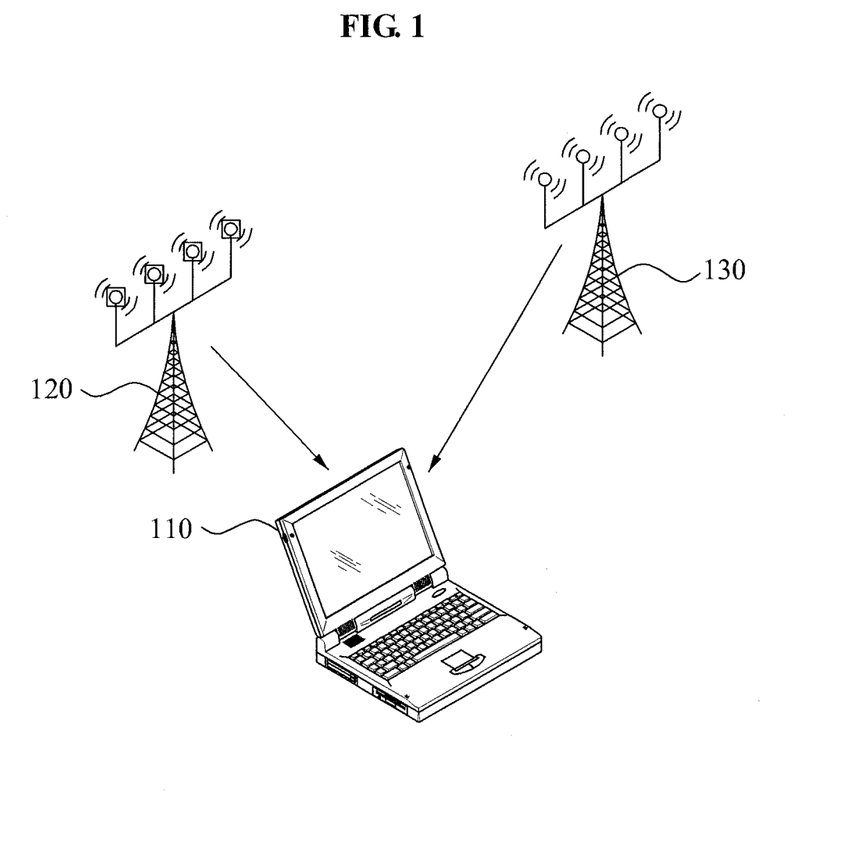
FIG. 1 illustrates a downlink multi-cell cooperative communication where two base stations are involved, according to an embodiment of the present invention.

FIG. 1 illustrates a downlink multi-cell cooperative communication where two base stations are involved, according to an embodiment of the present invention.

Although FIG. 1 limits a number of base stations involved in the downlink communication to two, that is, a multi-cell cooperative communication system is limited to include two base stations, the multi-cell cooperative communication system according to an embodiment of the present invention is not limited thereto and may include three or more base stations.

In the multi-cell cooperative communication system according to an embodiment of the present invention, both a serving cell base station 120 and a neighbor cell base station 130 transmit data signals required by a terminal 110 to the terminal 110, and thus, data transmission rate increases.

In this instance, each of the serving cell base station 120 and the neighbor cell base station 130 includes at least one first antenna (transmission antenna), and the terminal 110 includes at least one second antenna (reception antenna). FIG. 1 illustrates that each of the serving cell base station 120 and the neighbor cell base station 130 includes four first antennas. Accordingly, each of the serving cell base station 120 and the neighbor cell base station 130 may transmit a data signal to the terminal 110 by using the at least one first antenna, and the terminal 110 may receive a data signal by using the at least one second antenna. That is, the terminal 110, the serving cell base station 120, and the neighbor cell base station 130 perform a multi-input multi-output (MIMO) communication through multi-cell cooperation using a plurality of antennas.

Hereinafter, a downlink MIMO communication where a plurality of base stations, each base station including at least one first antenna, may cooperate with each other to transmit data signal to a terminal including at least one second antenna, will be described in detail.

To perform the multi-cell cooperative MIMO communication in a downlink, the plurality of base stations may perform precoding of data symbols to be transmitted, by using the same code book, and may generate data signals, and may transmit the generated data signals to the terminal 110 by using the same radio resource. In this instance, methods of precoding of a data symbol by using the code book may be classified into two as described below.

1. Joint Code Book Scheme

The joint code book scheme regards a plurality of cells managed by a plurality of base stations that are involved, in a cooperative communication as a single virtual cell, and performs a MIMO communication by using at least one first antenna included in each of the plurality of base stations and a second antenna included in the terminal.

The plurality of cells are regarded as the single virtual cell, and thus, the terminal including the at least one second antenna is regarded to perform a MIMO communication with a single virtual cell base station including a plurality of first antennas.

Accordingly, a size of at least one precoding matrix included in a code book is determined based on a sum of a number of first antennas included in each of the plurality of base stations.

That is, when the sum of the number of first antennas included in each of the plurality of base stations that are involved, in the cooperative communication is N, a size of precoding matrix included in the code book is N×N. Here, N is a predetermined integer number being greater than or equal to 1. Also, a precoding matrix is constituted by a plurality of precoding vectors. A precoding vector is each column vector of the precoding matrix. In this instance, the precoding matrix may be expressed as given in Equation 1 below.

$$P = \begin{bmatrix} P_{11} & \cdots & P_{1N} \\ P_{21} & \cdots & P_{2N} \\ \vdots & & \vdots \\ P_{N1} & \cdots & P_{NN} \end{bmatrix} = [\vec{P}_1, \ldots, \vec{P}_N] \quad \text{[Equation 1]}$$

Here, P is a precoding matrix, $P_{11}$ through $P_{NN}$ are elements of the precoding matrix, and $\vec{P}_1$ through $\vec{P}_N$ are precoding vectors. The code book may include one or more precoding matrices, Hereinafter, an operation where the plurality of base stations perform precoding of at least one data symbol to generate data signals based on the joint code book scheme, and transmits the generated data signals to the terminal 110 will be described in detail.

First, the plurality of base stations select a single precoding matrix to be used for transmission of data signals among a plurality of precoding matrixes included in the code book. In this instance, each of the plurality of base stations selects the same precoding matrix. Hereinafter, it is assumed that the precoding matrix P expressed as given in Equation 1 is selected.

Next, the plurality of base stations select at least one precoding vector of a plurality of precoding vectors constituting the selected precoding matrix P. Hereinafter, it is assumed that a number of the selected precoding vectors is M. Here, M is a predetermine integer number being greater than or equal to 1.

A single precoding vector is used for precoding a single data symbol, and thus, the number of the selected precoding vectors may be the same as a number of data symbols transmitted to the terminal from the plurality of base stations.

When a data signal transmitted by an $i^{th}$ antenna of N first antennas included in the plurality of base stations (a virtual cell base station managing a virtual cell) is $Q_i$, the selected M precoding vectors are $P_{C_i}(C_i \in \{1, 2, \ldots, N\})$, and the data symbol to be transmitted is $S_i$, the data signals to be transmitted via N first antennas may be expressed as given in Equation 2 below.

$$\begin{bmatrix} Q_1 \\ Q_2 \\ \vdots \\ Q_N \end{bmatrix} = [\vec{P}_{C_1}, \ldots, \vec{P}_{C_M}] \begin{bmatrix} S_1 \\ S_2 \\ \vdots \\ S_M \end{bmatrix} \quad \text{[Equation 2]}$$

Lastly, the plurality of base stations simultaneously transmit N precoded data signals $Q_1$ through $Q_N$ to the terminal by using the same radio resource. That is, the N precoded data signals may be transmitted to the terminal by using a single OFDM subcarrier.

Also, according to an embodiment of the present invention, to perform channel estimation of the terminal, each of the plurality of base stations performs precoding a reference signal by using a plurality of precoding vectors which are same as the plurality of precoding vectors used for precoding the data signals, and transmits the precoded reference signal to the terminal. In this instance, the data signals and the reference signal are precoded by using the same plurality of precoding vectors, and thus, the terminal may easily estimate the channels established between the terminal and the plurality of base stations. The precoded reference signals may be transmitted by only locating in a resource block assigned to the terminal.

2. Code Book-For-Each-Cell Scheme

According to a code book-for-each-cell scheme, each of the plurality of base stations involved, in a cooperative communication performs precoding of the same data symbol by using the same precoding vector to generate a data signal, and transmit the generated data signal to the terminal. In this instance, each of the plurality of base stations transmits the data signal to the terminal including at least one second antenna (reception antenna) by using at least one first antenna (transmission antenna), thereby performing an MIMO communication.

Accordingly, a size of at least one precoding matrix included in a code book is determined based on a number of the at least one first antenna included in each of the plurality of base station. That is, when the number of first antennas included in each of the plurality of base stations involved, in the cooperative communication is N, the size of the precoding matrix included in the code book is N×N. In this instance, the precoding matrix may be expressed as given in Equation 1, like the above described joint code book scheme.

Hereinafter, an operation where each of the plurality of base stations performs precoding of at least one data symbol to generate a data signal based on the code book-for-each-cell scheme, and transmits the generated data signal to the terminal will be described in detail.

First, each of the plurality of base stations selects a single precoding matrix to be used for transmission of the data signal from among a plurality of precoding matrixes included in the code book. Each of the plurality of base stations may select different precoding matrices. However, when the plurality of base stations obtains precoding information from a feedback from the terminal, each of the plurality of base stations may be restricted to select the same precoding matrix to decrease an amount of feedback.

Hereinafter, it is assumed that the precoding matrix P as given in Equation 1 is selected. Next, each of the plurality of base stations selects at least one precoding vector from a plurality of precoding vectors included in the selected precoding matrix P. In general, each of the plurality of base stations may select different precoding vectors. However, when precoding information is obtained from the feedback from the terminal, each of the plurality of base stations may be restricted to select the same precoding vector to decrease the amount of the feedback.

Also, a data symbol transmitted from each of the plurality of base station is the same data symbol. That is, each of the plurality of base stations performs precoding of the same data symbol by using the selected precoding vector to generate the data signal, and transmits the generated data signal to the terminal. Hereinafter, it is assumed that a number of selected precoding vectors and a number of data symbols to be transmitted is M.

When a data signal transmitted by an $i^{th}$ antenna of N first antennas included in each of the plurality of base stations is $Q_i$, the selected M precoding vectors are $P_{C_i}(C_i \in \{1, 2, \ldots, N\})$, and the data symbol to be transmitted is $S_i$, N data signals to be transmitted via N first antennas from each of the plurality of base stations may be expressed as given in Equation 2.

Lastly, each of the plurality of base stations simultaneously transmits N precoded data signals $Q_1$ through $Q_N$ to the terminal by using the same radio resource. That is, each of the plurality of base stations simultaneously transmits the N precoded data signals by using a single OFDM subcarrier.

Also, each of the plurality of base stations performs precoding a reference signals by using a plurality of precoding vectors which are same as the plurality of precoding vectors used for precoding the data signals, and transmits the precoded reference signals to the terminal, and thus, channels between the terminal and the plurality of base stations may be easily estimated. The precoded reference signal may be transmitted by locating in a resource block assigned to the terminal.

Up to here, the joint code book scheme and the code book-for-each-cell scheme that precode a data symbol to generate a data signal, and transmit the generated data signal to a terminal have been described. Hereinafter, a controlling operation of the plurality of base stations that is identically applicable to the joint code book scheme and the code book-for-each-cell scheme will be described.

According to an embodiment of the present invention, the plurality of base stations may mutually exchange precoding information used for selecting a precoding matrix and a precoding vector, and information about radio resource with each other. This enables each of the plurality of base stations to select the same precoding matrix, the same precoding vector, and the same radio resource.

In this instance, each of the plurality of base stations performs precoding at least one data symbol further based on the exchanged precoding information, and may determine the radio resource to be used for transmission of the data signal based on the exchanged information about radio resource.

The communication between the plurality of base stations may be performed via a backbone network being connected to a network, a dedicated line being directly connected between corresponding base stations, and a wireless communication. When the plurality of base stations exchange information via the wireless communication, the plurality of base stations may use a part of a frequency band used for a communication between a base station and the terminal, or may use another frequency band separated from the frequency band used for the communication between the base station and the terminal.

Also, the precoding information may be obtained from the terminal. In this instance, the terminal may transmit the precoding information to a serving cell base station.

The serving cell base station that receives the precoding information from the terminal may select a precoding matrix and a precoding vector based on the received precoding information.

Also, the serving cell base station may transmit, to a neighbor cell base station, scheduling information including at least one of the received precoding information, information about radio resource allocated to the terminal, and modulation and coding scheme (MCS) information.

In this instance, the neighbor cell base station may generate a data signal further based on the scheduling information, and may transmit the data signal to the terminal. That is, the neighbor cell base station may transmit the data signal to the terminal based on the scheduling information transmitted from the serving cell base station. In this instance, it is preferable that the serving cell base station and the neighbor cell base station are synchronized.

Also, there may be need for a subject that generally manages a cooperative communication performed between the plurality of base stations to cooperatively perform the MIMO communication. Therefore, according to an embodiment of the present invention, the plurality of base stations may include a first base station controlling the cooperative communication and at least one second base station that is controlled by the first base station. Hereinafter, the first base station is referred to as a supernode and a set of at least one cell managed by the at least one second base station is referred to as a supercell.

The supernode may determine scheduling of at least one terminal involved, in the cooperative communication and may transmit the determined scheduling information of the at least one terminal to the at least one second base station that manages the supercell to enable the at least one second base station to transmit a data signal according to the scheduling information.

Hereinafter, a method of constructing the supercell will be described in detail with reference to FIGS. 2 and 3.

Figure 2:
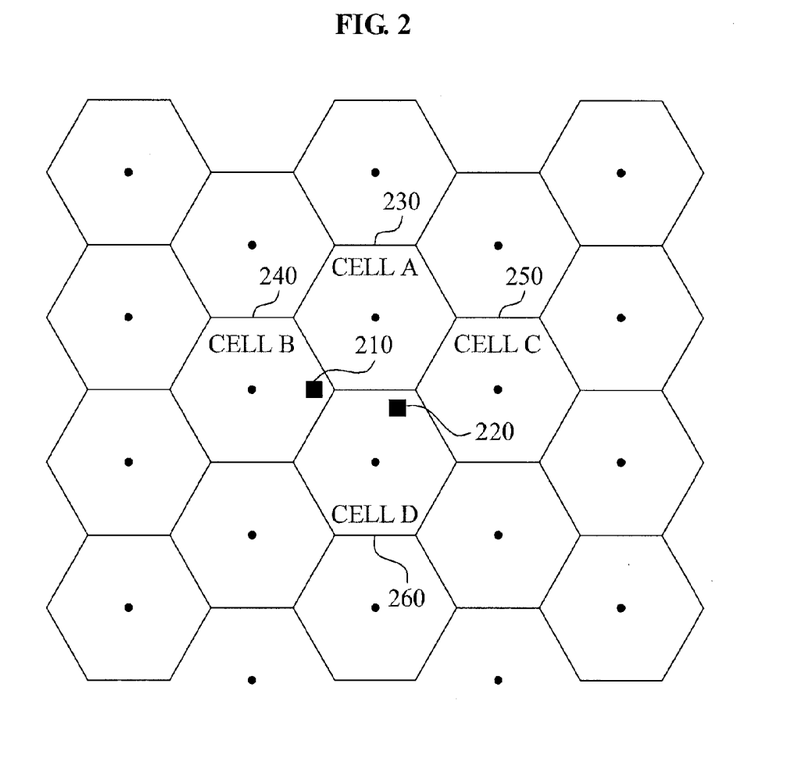
FIG. 2 illustrates a method of constituting a supercell based on a location of a terminal.

First, FIG. 2 illustrates the method of constructing the supercell based on locations of terminals 210 and 220.

According to an embodiment of the present invention, the terminals 210 and 220 may receive radio signals from a plurality of base stations located adjacent to the terminals 210 and 220, may measure intensities of the received plurality of radio signals, and may transmit information about the intensities of the measured plurality of radio signals to the supernode. As an example, a radio signal may be a reference signal.

In this instance, the supernode may select at least one second base station that manages the supercell from among the plurality of base stations based on the information about the intensities of the received plurality of radio signals.

As an example, the supernode may select a base station that transmits a radio signal having an intensity higher than a predetermined intensity among the plurality of radio signals, as the second base station. Accordingly, this may guarantee the terminals 210 and 220 to have a good wireless channel environment regardless of their locations.

In general, an intensity of a radio signal is in inverse proportional to a distance, and thus, as a distance between a cell and the terminals 210 and 220 becomes closer, an intensity of a radio signal transmitted from a base station that manages the cell increases. Therefore, according to an embodiment of the present invention, the supernode may select at least one base station that is close to the terminals 210 and 220, as the second base station.

As an example, as described in FIG. 2, the terminal 210 is located near a cell A 230, a cell B 240, and a cell D 260, and thus, the supernode may select the cell A 230, the cell B 240, and the cell D 260 as the supercell of the terminal 210.

Also, the terminal 220 is located near the cell A 230, the cell C 250, and the cell D 260, and thus, the supernode may select the cell A 230, the cell C 250, and the cell D 260 as the supercell of the terminal 220.

Figure 3:
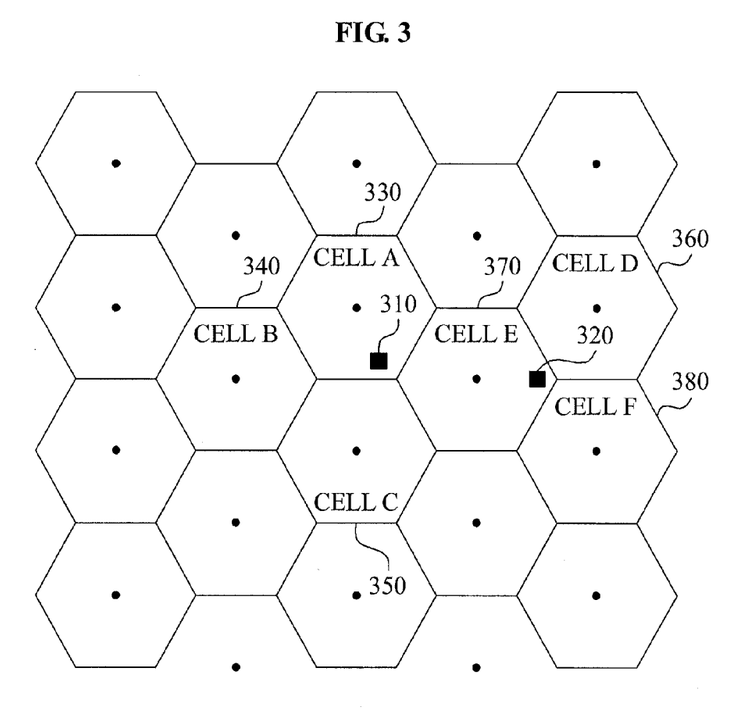
FIG. 3 illustrates a method of constituting a supercell that is in a fixed form, regardless of a location of a terminal.

Next, FIG. 3 illustrates a method of constructing a supercell that is in a fixed form regardless of locations of terminal 310 and 320.

In FIG. 3, a cell A 330, a cell B 340, and a cell C 350 construct a supercell regardless of the locations of the terminals 310 and 320. Hereinafter, the supercell is referred to as a first supercell. A cell D 360, a cell E 370, and a cell F 380 construct another supercell. Hereinafter, the other supercell is referred to as a second supercell. Accordingly, the terminal 310 may receive a radio signal from the first supercell, and the terminal 320 may receive a radio signal from the second supercell.

Here, a terminal that is located a boundary between supercells, such as the terminal 310, may be affected by an interference of a radio signal transmitted from a neighbor supercell, and thus, controlling an interference between supercells may be performed to decrease the interference between the supercells. As an example, a fractional frequency reuse method may be used for controlling of the interference between supercells.

According to an embodiment of the present invention, a supernode may limit cells belonging to a corresponding supercell controlled by the supernode to enable only a part of the cells to be involved, in a cooperative communication.

That is, according to an embodiment of the present invention, the supernode, namely, a first base station, may select at least one third base station from among at least one second base station that manages at least one cell included in the supercell, and may control only the selected third base station to transmit a data signal to the terminal. In this instance, the third base station may actually be a subject to transmit the data signal. Hereinafter, a cell that is managed by the at least one third base station is referred to as an active cell.

When only the active cell transmits a data signal to the terminal, the terminal may measure a channel condition with respect to only the active cell and may perform report, as opposed to measuring channel conditions with respect to all cells included in the supercell and reporting the measured channel conditions and precoding information, and the like, and thus, an amount of calculation of the terminal and a feedback overhead may be decreased.

In this instance, the terminal may measure intensities of radio signals transmitted from a serving cell and a neighbor cell of the serving cell and may feed back the measured intensities to the supernode. The supernode may select a cell that is actually helpful to the terminal based on the feedback information of the terminal, and may transmit the information of the selected active cells to the terminal.

As an example, when the supercell is constructed as shown in FIG. 3, the cell A 330 and the cell C 350 may be selected as active cells for the terminal 310. In this instance, the cell B 340 may not be involved in transmission of a data signal. Also, the terminal 320 is located in a center of the supercell, and thus, the cell D 360, the cell E 370, and the cell F 380 may be all selected as active cells for the terminal 320.

When a channel environment around the terminal is changed, the supernode may change an active cell based on a measured intensity of a radio signal fed back from the terminal. In this instance, the supernode may retransmit information about the changed active cell to the terminal.

Figure 4:
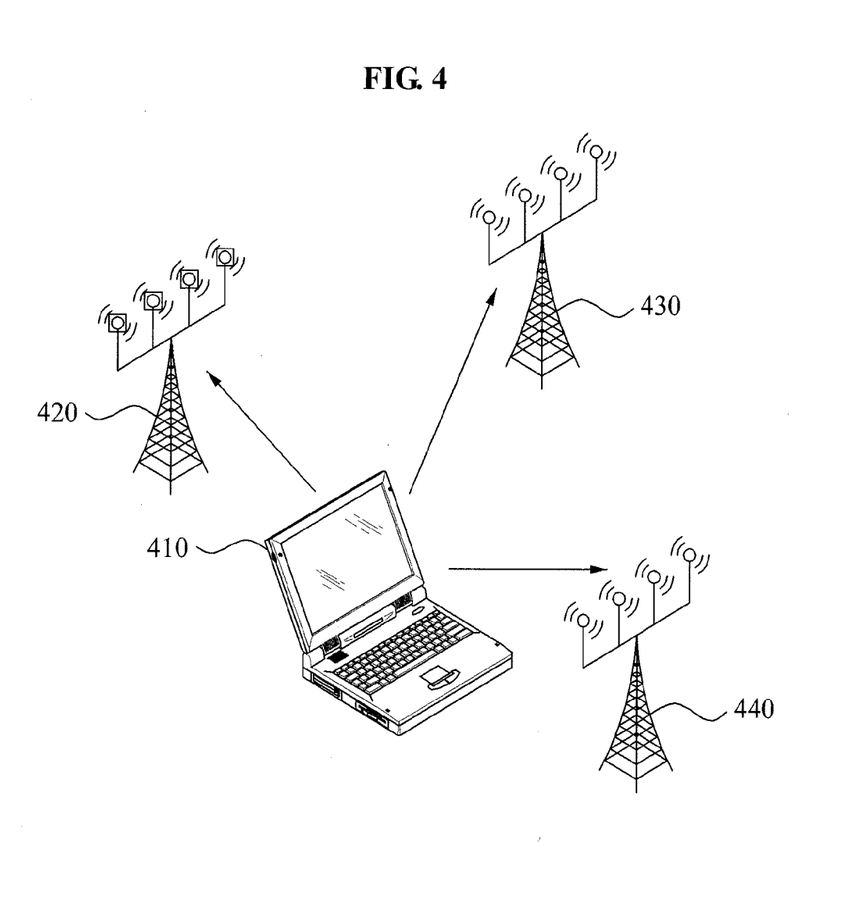
FIG. 4 illustrates an uplink multi-cell cooperative communication where three base stations are involved according to an embodiment of the present invention.

FIG. 4 illustrates a concept of an uplink multi-cell cooperative communication where three base stations are involved, according to an embodiment of the present invention.

Although FIG. 4 limits a number of base stations involved in the uplink communication to three, that is, a multi-cell cooperative communication system is limited to include three base stations, the multi-cell cooperative communication system according to an embodiment of the present invention is not limited thereto and may include two base stations or may include four or more base stations.

A terminal 410 may transmit a data signal to a serving cell base station 420, and may also transmit to neighbor cell base stations 430 and 440 which manage neighbor cells adjacent to a serving cell. Hereinafter, a data signal received by the serving cell base station 420 is referred to as a first data signal, and a data signal received by the neighbor cell base station 430 or the neighbor cell base station 440 is referred to as a second data signal.

When the neighbor cell base station 430 and the neighbor cell base station 440 that receive the second data signals, may perform processing the second data signals, and may transmit the processed second data signals to the serving cell base stations 420. In this instance, the serving cell base station 410 may demodulate first data from the first data signal by using the processed second data signals. Each of the processed second data signals may include at least one of second data included in a second data signal and information about the second data signal.

Hereinafter, a method of transmitting processed second data signals from a plurality of neighbor cell base stations to the serving cell base station will be described in detail.

A. Transmission of a Second Data Signal to a Serving Cell Base Station

According to an embodiment of the present invention, a neighbor cell base station may transmit a received second data signal itself to a serving cell base station. Also, according to another embodiment of the present invention, the neighbor cell base station may quantize the received second data signal and may transmit the quantized second data signal to the serving cell base station.

In this instance, the neighbor cell base station may transmit information about the second data signal to the serving cell base station, and the information of the second data signal may be the second data signal itself or quantized second signal.

Also, the neighbor cell base station may quantize all signals received from the terminal in addition to the second data signal and may transmit the quantized signals to the serving cell base station. As an example the neighbor cell base station may quantize a signal carried by a subcarrier through which a reference signal is transmitted, and may transmit the quantized signal.

B. Transmission of a Soft Decision Value and an Effective Noise Variance Value of Each of a Plurality of Second Data Symbols Included in a Second Data Signal to a Serving Cell Base Station.

According to an embodiment of the present invention, a neighbor cell base station may calculate a soft decision value and an effective noise variance value of each of the plurality of second data symbols included in the second data signal and may transmit the calculated soft decision value and effective noise variance value of each of the plurality of second data symbols to the serving cell base station.

That is, the neighbor cell base station may transmit information about the second data signal to the serving cell base station, and the information of the second data signal may be the soft decision value and the effective noise variance value of each of the plurality of second data symbols.

Here, each of the plurality of base stations includes a symbol detector and a channel decoder, and a soft decision value and an effective noise variance value may be inputs of the symbol detector and outputs of the channel decoder.

The serving cell base station may calculate a soft decision value and an effective noise variance value of each of a plurality of first data included in the first data signal based on the soft decision value and the effective noise variance value of each of the plurality of second data symbols.

Following is detailed description of an example where the plurality of base stations calculate the soft decision values and the effective noise variance values. The following example is described under an assumption of an OFDM transmission.

When a number of second antennas (transmission antennas) included in the terminal is $n_T$, a number of data symbols transmitted per subcarrier from the terminal is $n_S$, a number of first antennas (reception antennas) included in the base station is $n_R$, a data symbol transmitted from the terminal by using a $j^{th}$ subcarrier is a vector $s_j=[s_{1,j}, \ldots, s_{n_S,j}]^T$, and a data signal received by the base station is a vector $x_j=[x_{1,j}, \ldots, x_{n_R,j}]^T$, a relationship between $s_j$ and $x_j$ is established as given in Equation 3 below.

$$x_j = H_j P_j s_j + n_j \quad \text{[Equation 3]}$$

Here, $n_j$, which is a sum of additive white Gaussian noises (AWGN) and interference noises for each reception antenna of the $j^{th}$ subcarrier, is expressed as a vector $n_j=[n_{1,j}, \ldots, n_{n_R,j}]^T$. $P_j$ is a precoding matrix applicable to the $j^{th}$ subcarrier, a size of the precoding matrix being $n_T \times n_S$, and $H_j$ is a channel matrix of the $j^{th}$ subcarrier, a size of the channel matrix being $n_R \times n_T$.

Here, an average transmission power of each transmission antenna is normalized as given in Equation 4 below.

$$E\{s_j s_j^H\} = I_{n_S} \quad \text{[Equation 4]}$$

Here, E{ } is an effective power, a subscript H is a Hermitian Transpose, and $$I_{n_S}$$

is a unit matrix having a size of $n_S$.

According to an embodiment of the present invention, the base station may detect a transmission signal of each antenna based on a zero-forcing (ZF) detecting scheme. In this instance, a soft decision value of a data symbol may be calculated based on Equation 5 as below.

$$\begin{aligned}\tilde{s}_{ZF,j} &= (P_j^H H_j^H H_j P_j)^{-1} P_j^H H_j^H x_j \\ &= s_j + (P_j^H H_j^H H_j P_j)^{-1} P_j^H H_j^H n_j \\ &= s_j + n_j^{e\!f\!f}\end{aligned} \quad \text{[Equation 5]}$$

Here, $\tilde{s}_{ZF,j}$ is a soft decision value of a $j^{th}$ data symbol based on the ZF detecting scheme, and the subscript "eff" is an effective value.

Also, an effective noise variance of the $j^{th}$ subcarrier is $(\sigma_j^{e\!f\!f})^2 = [(\sigma_{1,j}^{e\!f\!f})^2, (\sigma_{2,j}^{e\!f\!f})^2, \ldots, (\sigma_{n_S,j}^{e\!f\!f})^2]$ and is calculated based on Equation 6 as given below. Here, $(\sigma_{i,j}^{e\!f\!f})^2$ is an effective noise variance with respect to $S_{i,j}$ that is an $i^{th}$ data symbol transmitted from the $j^{th}$ subcarrier.

$$(\sigma_j^{e\!f\!f})^2 = E\{n_j^{e\!f\!f}(n_j^{e\!f\!f})^H\} \quad \text{[Equation 6]}$$

According to another embodiment of the present invention, the base station may detect a transmission signal of each antenna based on a minimum mean square error (MMSE) detecting scheme. In this instance, a soft decision value of a data symbol may be calculated based on Equation 7 as given below.

$$\begin{aligned}\tilde{s}_{MMSE,j} &= (P_j^H H_j^H H_j P_j + \sigma_n I_{n_S})^{-1} P_j^H H_j^H x_j \\ &= (P_j^H H_j^H H_j P_j + \sigma_n I_{n_S})^{-1} P_j^H H_j^H H_j P_j s_j + n_j^{e\!f\!f}\end{aligned} \quad \text{[Equation 7]}$$

Here, $\tilde{s}_{MMSE,j}$ is the soft decision value of the $j^{th}$ data symbol based on the MMSE detecting scheme.

Also, the effective noise variance of the $j^{th}$ subcarrier may be calculated based on Equation 6.

C. Transmission of a Soft Decision Value of Each of a Plurality of Second Data Symbols Included in a Second Data Signal and a Mean Value of Effective Noise Variance Values to a Serving Cell Base Station According to an embodiment of the present invention, a neighbor cell base station may calculate the soft decision value and the effective noise variance value of each of the plurality of second data symbols included in the second data signal, may calculate, based on the calculated effective noise variance values, a mean value of the calculated effective noise variance values with respect to all resource blocks allocated to the terminal or resource blocks having a predetermined size, and may transmit the calculated soft decision value of each of the plurality of second data symbols and the mean value of the effective noise variance values to the serving cell base station.

That is, the neighbor cell base station may transmit information about the second data signal to the serving cell base station, and the information about the second data signal may be the soft decision value of each of the plurality of second data symbols and the mean value of the effective noise variance values.

In this instance, the mean value of the effective noise variance values calculated for each section, as opposed to individual effective noise variance values, is transmitted to the serving cell base station, and thus, an amount of transmitted data decreases.

An example of calculating the mean value of effective noise variance values from the neighbor cell base station will be described in detail.

First, when it is assumed that a number of total subcarriers existing in the resource blocks for which the mean value may be calculated is M, the mean value $(\overline{\sigma}_i^{\mathit{eff}})^2$ of the effective noise variance value $(\sigma_{i,j}^{\mathit{eff}})^2$ is calculated based on Equation 8 as given below.

$$(\overline{\sigma}_i^{\mathit{eff}})^2 = \frac{1}{M}\sum_{j=1}^{M}(\sigma_{i,j}^{\mathit{eff}})^2 \qquad \text{[Equation 8]}$$

Here, to make the mean value $(\overline{\sigma}_i^{\mathit{eff}})^2$ appropriately represent the effective noise variance value $(\sigma_{i,j}^{\mathit{eff}})^2$, it is required that the subcarriers located in the resource blocks for which the mean value is calculated are closes to each other in a frequency space and the same precoding is applied. That is, it is preferable to have a relationship of $P_j = P$ with respect to all j's, since when different precodings are applied, there is a high probability of having a great difference between the effective noise variance values of each subcarrier.

D. Transmission of a Soft Decision of Each of a Plurality of Second Data Bits Included in a Second Data Signal to a Serving Cell Base Station According to an embodiment of the present invention, a neighbor cell base station may calculate a soft decision value of each of the plurality of second data bits included in the second data signal, and may transmit the calculated soft decision value of each of the plurality of second data bits to the serving cell base station.

That is, the neighbor cell base station may transmit information of the second data signal to the serving cell base station, and the information about the second data signal may be the soft decision value of each of the plurality of second data bits.

Here, the soft decision value of each of the plurality of second data bits may be a long likelihood ratio (LLR) in a bit unit obtained after being processed through a symbol detector. That is, when an LLR of a second data bit b is LLR(b), the LLR(b) is a natural logarithms of a ratio of a probability (p(b=1)) that the second data bit b is "1" and a probability (p(b=0)) that the second data bit b is "0". This may be expressed as given in Equation 8 below.

$$LLR(b) = \log\frac{P(b=1)}{P(b=0)} \text{ or } \qquad \text{[Equation 8]}$$
$$LLR(b) = \log\frac{P(b=0)}{P(b=1)}$$

Here, the LLR of each second data bit transmitted to the serving cell base station may be an input value of a channel decoder or an output value generated as a result of decoding.

E. Transmission of Second Data Demodulated From a Second Data Signal to a Serving Cell Base Station According to an embodiment of the present invention, a neighbor cell base station may demodulate the second data by performing detecting of a symbol, decoding, and the like with respect to the second data signal and may transmit the demodulated second data to the serving cell base station.

That is, the neighbor cell base station may transmit the second data itself to the serving cell base station.

In this instance, the neighbor cell base station may transmit the demodulated second data only when the second data is successfully demodulated.

F. Others

According to an embodiment of the present invention, a neighbor cell base station may transmit information about second data signal generated based on one of A through E or may transmit second data, only when a request for information about the second data signal or a request for the second data is received from a serving cell base station.

Also, according to an embodiment of the present invention, when demodulation of the second is successful, the neighbor cell base station may transmit the demodulated second data to the serving cell base station, and when the demodulation of the second data fails, the neighbor cell base station may transmit information about the second data signal generated based on one of the A through D to the serving cell base station.

Also, according to an embodiment of the present invention, the neighbor cell base station may transmit only the information about whether the demodulation of the second data is successful or fails to the serving cell base station.

In this instance, the serving cell base station may transmit, to the neighbor cell base station, a request for transmitting the information about the second data signal or the second data, based on the information about whether the demodulation is successful or fails. The neighbor cell base station that receives the request may transmit information about the second data signal generated based on one of the A through D to the serving cell base station, when the demodulation of the second data fails, and the neighbor cell base station may transmit the second data generated based on the E to the serving cell base station, when the demodulation of the second data fails.

Hereinafter, a terminal that performs a cooperative communication with a plurality of base station will be described in detail with reference to FIG. 5.

Figure 5:
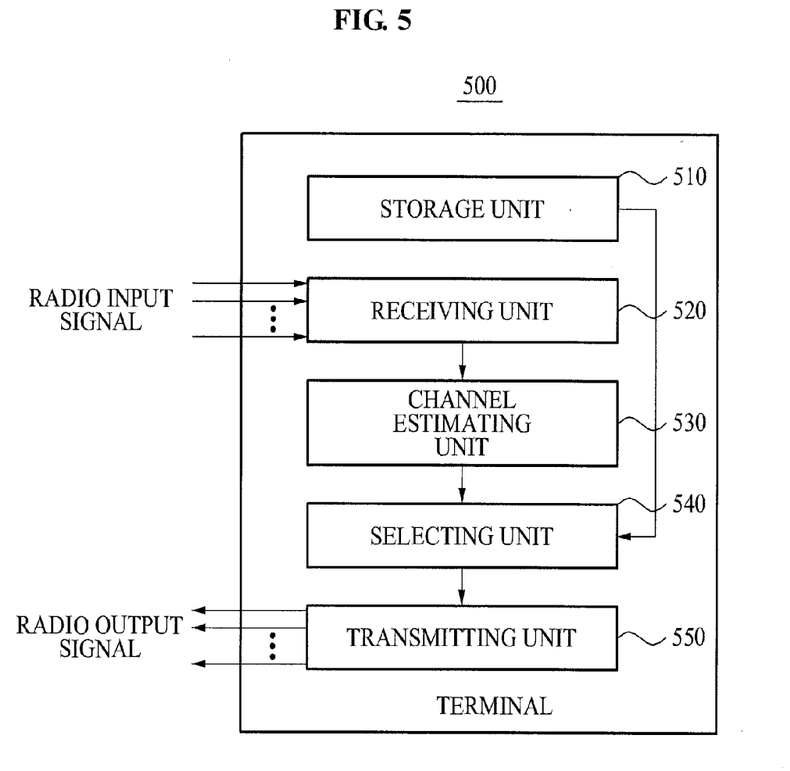
FIG. 5 is a block diagram illustrating a detailed configuration of a terminal according to embodiment of the present invention.

FIG. 5 is a block diagram illustrating a detailed configuration of a terminal according to embodiment of the present invention.

The terminal 500 according to an embodiment of the present invention includes a storage unit 510, a receiving unit 520, a channel estimating unit 530, a selecting unit 540, and a transmitting unit 550. Hereinafter, a function of each element will be described in detail.

The storage unit 510 may store a code book including at least one precoding matrix that is constituted by a plurality of precoding vectors. The code book stored in the storage unit 510 is the same as a code book stored in each of the plurality of base stations.

The receiving unit 520 may receive radio signals from the plurality of base stations. As an example, a radio signal may be one of a reference signal or a data signal.

The channel estimating unit 530 may estimate conditions of the plurality of channels established between the plurality of base stations and terminal 500 based on the received radio signals.

The selecting unit 540 may select a single precoding matrix from among the at least one precoding matrix included in the code book based on the estimated conditions of the plurality of channels, and may select at least one precoding vector from among a plurality of precoding vectors constituting the selected single precoding matrix.

The transmitting unit 550 may transmit a second feedback signal including information about the selected at least one precoding vector to at least one base station of the plurality of base stations.

According to an embodiment of the present invention, the selecting unit 540 may select a single precoding matrix from among the at least one precoding matrix with respect to a predetermined resource blocks or based on resource blocks that the terminal 500 prefers, and may select at least one precoding vector from among a plurality of precoding vectors included in the selected single precoding matrix.

A size of the resource block that is a target of the selected precoding matrix and the selected precoding vector may be determined in advance to be diverse.

According to an embodiment of the present invention, to decrease an amount of information of the second feedback signal transmitted through the transmitting unit 550, the selecting unit 540 may select a preferred precoding matrix and a preferred precoding vector based on an assumption that the same precoding matrix and the same precoding vector are applied to the predetermined resource blocks or to the resource blocks that the terminal 500 prefers.

According to another embodiment of the present invention, the selecting unit 540 may select a precoding matrix and a precoding vector which are preferred for each individual resource block.

Also, according to an embodiment of the present invention, the terminal 500 may include an intensity measuring unit (not illustrated) that measures intensities of a plurality of radio signals. In this instance, the transmitting unit 550 may transmit a first feedback signal including the measured intensities of the plurality of radio signals.

As the description described above, the first feedback signal may be used for selecting at least one second base station that manages a supercell.

When the supernode (the first base station) selects, based on the first feedback signal, the second base station that manages the supercell, and controls only the at least one second base station to transmit a data signal to the terminal 500, the receiving unit 510 may receive information about the at least one second base station from the supernode, and only receives a radio signal transmitted from the at least one second base station base on the received information.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A multi-cell cooperative communication system, comprising:
a plurality of base stations, each of the plurality of base stations includes a same code book and one or more first antennas that transmit data signals using at least one of the first antennas to a terminal including at least one second antenna, each of the plurality of base stations are configured to:
select a same precoding matrix from among at least one precoding matrix of the same code book,
mutually exchange precoding information,
select a same precoding vector constituting the same precoding matrix using the mutually exchanged precoding information,
generate the data signals by precoding at least one data symbol using the same precoding vector, and
transmit the data signals to the terminal by using a same radio resource.

2. The system of claim 1, wherein each of the plurality of base stations are further configured to:
perform precoding of the at least one data symbol further based on the mutually exchanged precoding information; and
determine, based on the information about radio resources, the radio resource used for transmitting the data signals.

3. The system of claim 1, wherein each of the plurality of base stations are further configured to:
preform precoding of a reference signal by using the same precoding vector; and
transmit of the data signal and the precoded reference signal to the terminal.

4. The system of claim 1, wherein the plurality of base stations include a serving cell base station and at least one neighbor cell base station,
wherein the serving cell base station receives the precoding information from the terminal.

5. The system of claim 1, wherein the same code book comprises the at least one precoding matrix, and a size of the at least one precoding matrix is determined based on a sum of a number of the one or more first antennas included in each of the plurality of base stations.

6. The system of claim 1, wherein the same code book comprises the at least one precoding matrix, and a size of the at least one precoding matrix is determined based on a number of the one or more first antennas included in each of the plurality of base stations.

7. The system of claim 1, wherein the plurality of base stations comprises a first base station and at least one second base station, and the first base station is configured to control the transmission of the data signals of the at least one second base station.

8. The system of claim 7, wherein the first base station is further configured to select the at least one second base station from among the plurality of base stations based on intensities of radio signals that the plurality of base stations transmit to the terminal.

9. The system of claim 7, wherein the first base station is further configured to:
select at least one third base station from among the at least one second base station; and
control the transmission of the data signals of the at least one second base station to enable the at least one third base station to transmit the data signals to the terminal.

10. A terminal performing multi-input multi-output (MIMO) communication with a multi-cell cooperative system including a plurality of base stations, the terminal comprising:
- a storage unit to store a code book including at least one precoding matrix constituted by a plurality of precoding vectors;
- a receiving unit to receive radio signals from the plurality of base stations;
- a channel estimating unit to estimate conditions of the plurality of channels established between the plurality of base stations and the terminal, based on the radio signals;
- a selecting unit to select a single precoding matrix from among the at least one precoding matrix based on the estimated conditions of the plurality of channels, and to select at least one precoding vector from among a plurality of precoding vectors constituting the single precoding matrix; and
- a transmitting unit to transmit a second feedback signal including information about the selected at least one precoding vector to at least one base station of the plurality of base stations,
- wherein each of the plurality of base stations are configured to mutually exchange precoding information based at least in part on the second feedback signal, select a same precoding matrix from among the at least one precoding matrix using the mutually exchanged precoding information, select a same precoding vector constituting the same precoding matrix, generate data signals by precoding at least one data symbol using the same precoding vector, and transmit the data signals to the terminal by using a same radio resource.

11. The terminal of claim 10, further comprising:
an intensity measuring unit to measure intensities of the plurality of radio signals,
wherein the transmitting unit further transmits a first feedback signal including the intensities of the plurality of radio signals.

12. The terminal of claim 10, wherein:
the plurality of base stations include a first base station and at least one second base station; and
the receiving unit receives information about the at least one second base station from the first base station, and receives a radio signal from the at least one second base station.

* * * * *